Jan. 31, 1950   J. M. GIRARD   2,495,716
RECTIFIER
Filed Feb. 9, 1946

INVENTOR.
JEAN M. GIRARD
BY
Robert Harding Jr.
ATTORNEY

Patented Jan. 31, 1950

2,495,716

UNITED STATES PATENT OFFICE 2,495,716

RECTIFIER

Jean M. Girard, Paris, France, assignor to International Standard Electric Corporation, New York, N. Y., a corporation of Delaware Application February 9, 1946, Serial No. 646,691
In France October 13, 1943

Section 1, Public Law 690, August 8, 1946
Patent expires October 13, 1963

10 Claims. (Cl. 175—366)

This invention relates to a rectifier and particularly to the contact type of rectifier using selenium and other elements and compounds having asymmetric conductivity. The invention in particular relates to rectifiers or detectors where an important consideration is uniform sensitivity to voltages of comparatively small magnitudes. Such detectors may be used in various types of apparatus, such as communication equipment, and also in various types of measuring equipment, such as meters and the like.

In accordance with the invention, a structure is provided in which a rectifying or detecting action occurs between the selenium or other material and a pointed metallic electrode. While detectors using electrodes have been known for a long time, such devices have labored under various handicaps. As a rule, the contact pressure is relatively great and varies over a substantial range. Inasmuch as the rectifying or detector action is intimately associated with the crystalline and molecular structure of the rectifying material, it is evident that contact pressure will be an important factor in operation. A structure embodying the invention provides a detector having a point contact where the contact pressure will not vary and wherein the sensitivity of the detector as a whole will be maintained at optimum value over a long period of use.

The invention may assume various forms, some of which are shown in the drawings. Referring, therefore, to the drawings, Figure 1 shows a cross sectional view of one example of a static detector structure made according to certain features of the invention.

Figure 1:
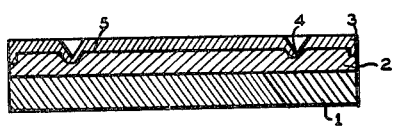

Referring now to Figure 1, metallic base plate 1 of iron or other suitable material has its surface covered by layer 2 of selenium or other material having asymmetric conductivity. Layer 2 of selenium may have any desired thickness as used in conventional construction of blocking layer cells. It is understood that the selenium or other material is disposed on support 1 in a suitable form for rectification.

Selenium layer 2, in turn, is covered with insulating layer 3 adapted to resist the temperature of the ovens in which the entire structure is normally treated. Insulating layer 3 is provided with a plurality of conical apertures 4 giving access to selenium layer 2. In order to promote a thorough bonding between insulating layer 3 and selenium layer 2, a series of rectilinear channels 5 may be provided. These may advantageously be so disposed so that conical apertures 4 coincide with the channels. If desired, these may be ribs.

It is understood that the entire barrier cell undergoes the conventional treatment in ovens and includes the step of covering insulating layer 3 with a thin conducting metal or alloy, as by the use of a spray gun.

After the formation of the structure, a light rubbing of the metallic sprayed surface will suffice to remove both the metallic sprayed surface and a portion of insulating layer 3, and thus expose conical apertures 4. It is, thus, possible to reduce the effective area of conducting material above layer 2 to the points to be formed by conical apertures 4. It is apparent that the resulting structure provides a detector without any dangerous pressure on the barrier layer of selenium. This construction also facilitates the provision of leads. Thus, for example in Figures 2 and 3, a finished structure is shown. Conical apertures 4 have some sprayed metal 4a disposed therein, and a glob of solder 4b provides a connection between metal 4a and connecting strip 7. Connection strips 7 go to terminals 6 of conventional construction to which outside connections may be made.

It is understood that a portion of selenium 2 and one conical aperture 4 with its metal layer 4a forms one cell unit. The various cells in one disc of material may be connected in any desired fashion and are rugged enough to be used in various manners. A plurality of cell units may be provided, and one or more may be selected depending upon the operating characteristics of a particular unit.

Figure 2:
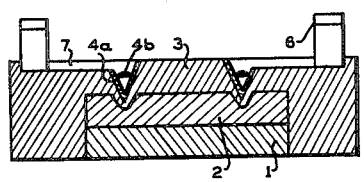
Figures 2 and 3 are sectional elevation and plan respectively of a modification of the structure shown in Figure 1.
Figure 3:
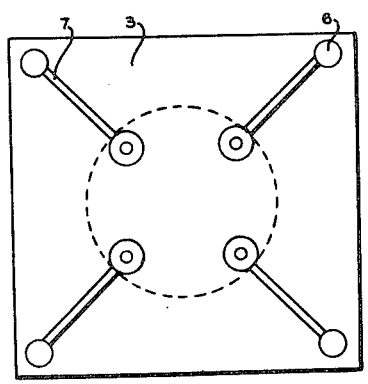

The construction disclosed in Figures 1 to 3 inclusive provide fixed contact points. It is possible, however, to provide contact points that may be set to any desired position and modified at will. In prior art detectors, it has been customary to immobilize the detecting unit by sealing the same with varnish, paraffin or other material. In the event of damage occasioned by excessive voltage, it has been necessary to replace such a structure. The construction shown in Figures 4 to 6 inclusive, however, combine the advantages of a perfectly immobilized detector and one that may be easily adjusted to a new sensitive region.

Figure 4:
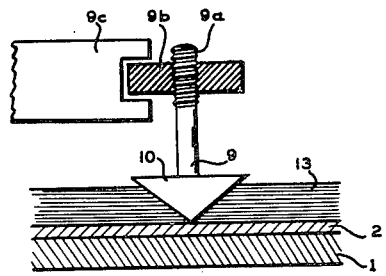
Figures 4 and 5 are sectional elevations of two examples of static detectors embodying other features of the invention.

Referring particularly to the structure shown in Figure 4, supporting layer 1 has selenium layer 2 disposed over it in the usual fashion. Selenium layer 2 is covered by membrane 13 of elastic or plastic material such as natural rubber, latex or any of the synthetic rubbers. Contact member 9 of metal is provided with a blunt-pointed metallic conical member 10 which is adapted to penetrate membrane 13 and establish fine contact with layer 2.

Membrane 13 functions to fix pointed electrode 10 in position and, by virtue of its elasticity, prevents excessive pressures against layer 2. It is clear that the shape of electrode 10 hinders its ready penetration within membrane 13.

Suitable micrometric means may be provided for controlling the penetration of electrode portion 10. Thus, part 9 may be threaded at 9a and cooperates with nut 9b fixed against vertical movement by bracket 9c. It is clear that, by turning nut 9b, rod 9 may be raised or lowered.

Figure 5:
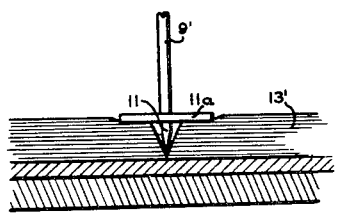

Referring to Figure 5, substantially the same structure is shown except that rod 9' carries sharp-pointed portion 11 and circular guard member 11a. It is clear that guard member 11a prevents sharp pin point 11 from going through membrane 13' too fast. The same micrometric drive, as shown in Figure 4, may be applied to Figure 5.

In the structure shown in Figures 4 and 5, relative displacement of contact points 10 or 11 and of the membrane-covered disc permits regeneration of the detector.

Figure 6:
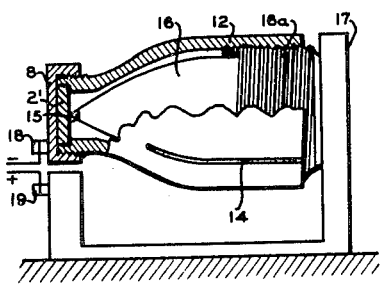
Figure 6 is an elevation partly in section showing still another modification of the invention.

In Figure 6, a construction is shown in which precise control over contact pressure is provided. Disc 2' of selenium is set in a suitable recess at the bottom of a cup 12 split at 14 to endow the cup with some flexibility. Disposed within cup 12 is needle tip 15 carried by needle body 16. Needle body 16 is provided with threaded portion 16a cooperating with a corresponding threaded portion in cup 12. Needle point 15 is somewhat eccentric of needle body 16 so that rotation of needle body 16 will cause needle tip 15 to move over layer 2'. It is also possible to have needle body 16 eccentric in cup 12. A suitable support 17 carries the entire structure, as shown. Terminals 18 and 19 are provided. It is understood that, if cup 12 is of metal, means must be provided for insulating needle tip 15 from the cup. Thus, needle body 16 may be of insulating material.

What is claimed is:

1. A detector comprising a rigid support of metal forming one electrode, an asymmetric conducting layer of selenium or the like over said support, an insulating layer over said asymmetric layer, said insulating layer having at least one conical aperture therethrough with the tip of the cone against the asymmetric layer, and a metal disposed in said conical aperture adapted to function as the other electrode.

2. The detector of claim 1 wherein said conical aperture has a surface layer of metal sprayed on.

3. The detector of claim 1 wherein said conical aperture has a surface layer of metal sprayed on and wherein a connection is soldered to said layer of metal.

4. A detector comprising a rigid metallic support forming one electrode, a layer of selenium or other asymmetric material on said support, a flexible insulating membrane over said selenium and a second electrode having a pointed portion penetrating said membrane and making a point contact with said selenium.

5. The structure of claim 4 wherein said pointed electrode has a blunt head.

6. The structure of claim 4 wherein said pointed electrode has a sharp point and has a collar portion providing an extended surface bearing against said membrane.

7. A detector comprising a rigid metal support comprising one electrode, a layer of selenium or the like covering said support, said selenium having channels formed therein, an insulating layer disposed over said selenium, said insulating layer having conical apertures therethrough with the tip of the cone engaging said selenium at said channels, and an electrode disposed in each of said conical apertures.

8. The structure of claim 7 wherein each of said second electrodes consists of a thin layer of metal sprayed or otherwise deposited on said insulating material at the respective conical apertures.

9. A detector comprising a metallic support forming one electrode, a layer of selenium or other asymmetric material on said support, an insulating layer over said selenium, a second electrode having a pointed portion penetrating said layer and making a point contact with said selenium, and means for determining the degree of penetration of said insulating layer by said pointed electrode.

10. A detector comprising a metallic support forming one electrode, a layer of selenium or other asymmetric material on said support, a flexible insulating membrane over said selenium, a second electrode having a pointed portion adapted to penetrate said membrane for point contact with said selenium, and a support for said second electrode, said support including means for adjusting said second electrode with respect to said layer of selenium.

JEAN M. GIRARD.

REFERENCES CITED

The following references are of record in the file of this patent:

UNITED STATES PATENTS

| Number | Name | Date |
| --- | --- | --- |
| 756,676 | Midgley | Apr. 5, 1904 |
| 1,211,754 | Rawls | Jan. 9, 1917 |
| 1,826,955 | Ruben | Oct. 13, 1931 |
| 2,156,660 | VanGeel | May 2, 1939 |
| 2,161,600 | VanGeel | June 6, 1939 |
| 2,406,405 | Salisbury | Aug. 27, 1946 |